United States Patent
Petersen et al.

(10) Patent No.: US 10,788,019 B2
(45) Date of Patent: Sep. 29, 2020

(54) LIQUID CONTAINMENT ASSEMBLY FOR A WIND TURBINE

(71) Applicant: Vestas Wind Systems A/S, Aarhus N. (DK)

(72) Inventors: Morten Hedegaard Petersen, Randers Nv (DK); Steffen Hougaard, Risskov (DK); Erland Falk Hansen, Mørke (DK); Rasmus Dejgaard Jensen, Århus C (DK)

(73) Assignee: Vestas Wind Systems A/S, Aarhus N. (DK)

( * ) Notice: Subject to any disclaimer, the term of this patent is extended or adjusted under 35 U.S.C. 154(b) by 137 days.

(21) Appl. No.: 15/753,992

(22) PCT Filed: Aug. 23, 2016

(86) PCT No.: PCT/DK2016/050283
§ 371 (c)(1),
(2) Date: Feb. 21, 2018

(87) PCT Pub. No.: WO2017/032380
PCT Pub. Date: Mar. 2, 2017

(65) Prior Publication Data
US 2018/0245572 A1    Aug. 30, 2018

(30) Foreign Application Priority Data
Aug. 24, 2015    (DK) ................................. 2015 70543

(51) Int. Cl.
*F03D 80/00* (2016.01)
*F03D 80/80* (2016.01)
(Continued)

(52) U.S. Cl.
CPC ............. *F03D 80/80* (2016.05); *B65D 90/24* (2013.01); *F03D 80/00* (2016.05); *F03D 80/70* (2016.05);
(Continued)

(58) Field of Classification Search
CPC .......... F03D 80/00; F03D 80/60; F04D 80/80; Y02E 10/72; Y02E 10/726; F16N 31/00;
(Continued)

(56) References Cited

U.S. PATENT DOCUMENTS 1,521,531 A * 12/1924 Hanold ...................... A45F 3/14
224/603
4,707,969 A * 11/1987 Marino .............. B65D 88/1618
53/449

(Continued)

FOREIGN PATENT DOCUMENTS

| CN | 1211222 A | 3/1999 |
|---|---|---|
| CN | 201849863 U | 6/2011 |

(Continued)

OTHER PUBLICATIONS

English Translation of WO2013087074A1 (Year: 2013).*
(Continued)

*Primary Examiner* — Eldon T Brockman
*Assistant Examiner* — Wesley Le Fisher
(74) *Attorney, Agent, or Firm* — Wood Herron & Evans LLP

(57) ABSTRACT

The application relates to a liquid containment assembly (200) for a wind turbine (10), comprising: a support (202) for supporting wind turbine equipment (220); and a flexible container (300) suspended beneath the support (202). The flexible container (300) is arranged such that it is moveable between a collapsed position, in which the liquid containment assembly (200) has a first depth (D1), and an expanded (Continued)

position, in which the liquid containment assembly (200) has a second depth (D2), the second depth being greater than the first depth.

18 Claims, 10 Drawing Sheets

(51) Int. Cl.
   *F03D 80/70* (2016.01)
   *F16N 31/00* (2006.01)
   *B65D 90/24* (2006.01)

(52) U.S. Cl.
   CPC .............. *F03D 80/82* (2016.05); *F16N 31/00* (2013.01); *F05B 2260/98* (2013.01); *F16N 31/006* (2013.01); *Y02E 10/72* (2013.01); *Y10T 137/5762* (2015.04)

(58) Field of Classification Search
   CPC ...... B65D 21/08; B65D 21/086; B65D 90/24; F25D 21/14; F24F 13/22; B08B 17/025
   USPC .............................................. 220/8, 9.1, 9.4
   See application file for complete search history.

(56) References Cited

U.S. PATENT DOCUMENTS

| | | | | |
|---|---|---|---|---|
| 5,437,384 | A * | 8/1995 | Farrell | B65D 19/12 |
| | | | | 220/1.5 |
| 5,746,343 | A * | 5/1998 | Waltke | B65D 19/12 |
| | | | | 206/600 |
| 5,897,012 | A * | 4/1999 | Sortwell | B65D 19/12 |
| | | | | 206/600 |
| 6,019,243 | A * | 2/2000 | Marino | B65D 90/24 |
| | | | | 220/573 |
| 7,075,192 | B2 * | 7/2006 | Bywaters | F03D 7/0248 |
| | | | | 290/55 |
| 8,127,956 | B2 * | 3/2012 | Krotts | D06F 95/004 |
| | | | | 220/764 |
| 9,051,118 | B2 * | 6/2015 | Jacobson | B65D 90/24 |
| 10,040,602 | B1 * | 8/2018 | Talgo | B65D 21/086 |
| 2010/0124507 | A1 * | 5/2010 | Wallace | F16N 31/004 |
| | | | | 416/248 |
| 2011/0272949 | A1 * | 11/2011 | Matsuo | F03D 80/88 |
| | | | | 290/55 |
| 2012/0067897 | A1 | 3/2012 | Trinkel et al. | |
| 2013/0058070 | A1 * | 3/2013 | Gaard | H01F 27/025 |
| | | | | 361/836 |
| 2015/0108764 | A1 * | 4/2015 | Moeller | H01F 27/40 |
| | | | | 290/55 |
| 2015/0300323 | A1 * | 10/2015 | Neumann | F03D 80/00 |
| | | | | 415/168.1 |

FOREIGN PATENT DOCUMENTS

| | | | | |
|---|---|---|---|---|
| CN | 203158389 U | 8/2013 | | |
| CN | 203268539 U | 11/2013 | | |
| CN | 203997482 U | 12/2014 | | |
| DE | 102011052506 A1 | 2/2013 | | |
| DE | 102011088920 A1 | 6/2013 | | |
| EP | 2756190 A1 | 7/2014 | | |
| EP | 2908006 A1 | 8/2015 | | |
| ES | 2333761 B1 * | 1/2011 | | |
| WO | 2013037086 A1 | 3/2013 | | |
| WO | WO-2013037086 A1 * | 3/2013 | ............. | F03D 80/00 |
| WO | 2013087074 A1 | 6/2013 | | |
| WO | WO-2013087074 A1 * | 6/2013 | | |

OTHER PUBLICATIONS

English Translation of ES2333761 B1 (Year: 2011).*
Danish Patent and Trademark Office, Search and Examination Report in PA 2015 70543, dated Mar. 7, 2016.
European Patent Office, International Search Report and Written Opinion in PCT/DK2016/050283, dated Dec. 7, 2016.
China National Intellectual Property Adminstration, First Notification of Office Action in CN Application No. 201680060015.4, dated Mar. 12, 2019.

* cited by examiner

LIQUID CONTAINMENT ASSEMBLY FOR A WIND TURBINE

The present invention relates to a liquid containment assembly for a wind turbine. In particular, the present invention relates to a liquid containment assembly for a wind turbine for collecting liquid leaked or spilled from the wind turbine equipment.

Wind turbines typically comprise a wind turbine tower and a wind turbine nacelle positioned on top of the tower. The wind turbine rotor, normally comprising three wind turbine blades, is connected to the nacelle through a low speed shaft which extends out of the front of the nacelle, as illustrated in FIG. 1.

The nacelle is typically provided with some, but not necessarily all, of the electrical equipment needed to transform, convert and in other ways handle the power being produced by the generator in the nacelle. With offshore and land based wind turbines, the rest of this power handling equipment is often placed on platforms inside the wind turbine tower within a module.

The wind turbine equipment may include a number of components containing liquid, such as cooling, insulating, or lubricating oil. For example, electrical transformer units used to step-up the voltage generated by wind turbines during use may contain thousands of litres of cooling liquid. If this liquid is leaked from the wind turbine equipment during transport to the installation site or during subsequent use of the wind turbine, this may be problematic. For example, such leaked liquid may also be expensive or time consuming to clean up.

It would be desirable to provide a liquid containment assembly for a wind turbine which is capable of collecting liquid leaked from wind turbine equipment.

SUMMARY OF THE INVENTION

According to a first aspect of the invention there is provided a liquid containment assembly for a wind turbine, the liquid containment assembly comprising: a support for supporting wind turbine equipment; and a flexible container suspended beneath the support and arranged such that it is moveable between a collapsed position, in which the liquid containment assembly has a first depth, and an expanded position, in which the liquid containment assembly has a second depth, the second depth being greater than the first depth.

By providing a flexible container that is moveable between a collapsed position and an expanded position, the liquid containment assembly can be retained in a normally compact condition for ease of transportation, handling and installation, but can also be expanded to contain a liquid leak or spillage if required. Further, as the flexible container can be collapsed, the liquid containment assembly can be positioned beneath wind turbine equipment during transport, even where clearance is limited, to collect small amounts of liquid released during transport, for example due to a change in orientation of wind turbine equipment, or due to component or seal failure.

As used herein, the term "flexible" is used to mean that at least part of the container is pliable so that the container is moveable between collapsed and expanded positions without excessive force and without significant damage to the container.

As used herein, the term "depth" refers to the maximum dimension of the flexible container in a direction perpendicular to the plane of the support.

As used herein, the term "beneath" refers to the vertical position of the flexible container relative to the support when installed in the wind turbine tower.

As the flexible container is moveable between a collapsed position and an expanded position, it has a first capacity when in the collapsed position and a second capacity when in the expanded position, the second capacity being greater than the first capacity. In some examples, the second capacity is at least twice the first capacity. In other examples, the second capacity may be less than twice the first capacity, for example 1.5 times the first capacity. This may be suitable, for instance, where only a small reduction in capacity is required for transportation. In yet further examples, the second capacity is at least three, four, five, or six times greater than the first capacity.

The flexible container may comprise a flexible bag.

In other examples, the flexible container may be formed from a combination of flexible walls and rigid walls. For example, the flexible container may comprise flexible side walls in combination with one or more rigid bottom walls.

The flexible container may have any suitable shape, such as spherical, cylindrical, trapezoidal, or cuboid shapes. The flexible container may be a rectangular parallelepiped.

In one example, the flexible container comprises a rectangular parallelepiped shaped flexible bag.

In some examples, the flexible container further comprises a rigid frame from which the flexible bag is suspended.

The liquid containment assembly may further comprise a retaining means for releasably holding the flexible container in the collapsed position.

By including a retaining means, the flexible container may be prevented from moving to the expanded position under its own weight when this would be undesirable, for example where the flexible container may accidentally snag on adjacent components during transport or installation, or otherwise get in the way. It also allows the size of the liquid containment assembly to be minimised when the expanded capacity of the flexible container is not required.

Alternatively, the liquid containment assembly may be arranged such that the flexible container is free to move from the collapsed position to the expanded position under its own weight or under the weight of liquid therein.

The retaining means may comprise one or more strops, cables, ropes, hook and loop fasteners, temporary welds, snap fasteners, or any combination thereof.

In some examples, the retaining means is adapted to release the flexible container from the collapsed position when a weight of liquid in the flexible container exceeds a threshold value.

Advantageously, this allows the flexible container to be expanded only when its expanded capacity is required, without the need for manual intervention by an operator. This may be of particular benefit where access to the liquid containment assembly is restricted, for example on an offshore wind turbine.

The retaining means may be arranged in any suitable manner in order to release the container from the collapsed position when the weight of liquid in the container exceeds a threshold amount. For example, the retaining means may comprise one or more hook and loop fasteners which are released when a force applied to the fasteners exceeds a certain amount.

In such embodiments, the threshold weight of liquid at which the flexible container is automatically released from the collapsed position should be determined so that the flexible container is automatically released before its capacity in the collapsed position is exceeded. It will be appreciated that this may be determined from the volume of the flexible container when in the collapsed position and the density of the liquid with which the liquid containment assembly is designed for use.

Alternatively, the releasing means may be releasable manually to allow the flexible container to move from the collapsed position to the expanded position under its own weight or under the weight of liquid contained therein.

In some examples, the support comprises an access hole for providing access to the flexible container from above the support.

With this arrangement, liquid in the flexible container may be removed from the container through the access hole, for example using a suction hose, without the need for removal of the flexible container or for taps or plugs which add cost and may leak.

Alternatively, or in addition, the flexible container may be emptied in situ from beneath, for example by opening one or more taps or removing one or more plugs in a lower wall of the flexible container to allow liquid to flow out of the container. As a further alternative, the flexible container may be emptied of liquid by first separating the container from the support and emptying it while removed.

The support may comprise one or more openings through which liquid may drain into the flexible container. For example, the support may be formed from two or more beams separated by a gap through which liquid may pass. The support may comprise a platform having an open mesh structure. For example, the support may comprise one or more open mesh floor panels. The support may comprise a floor formed from one or more grating panels, such as grating panels made from stainless steel or aluminium. Advantageously, this allows fast drainage of liquid through the support and into the flexible container below. Alternatively, the support may comprise a fluid impermeable floor panel with one or more inclined sections along which liquid may flow. In such examples, the flexible container should be positioned beneath the lower edge of the floor panel so that liquid flowing off the lower edge of the floor panel is collected in the flexible container.

The capacity of the flexible container when in the expanded position may selected as desired, for example based on the amount of liquid contained in the wind turbine equipment for which the support is intended. In some examples, the flexible container has a capacity of at least 2000 litres when in the expanded position.

In other examples, the flexible container may have a capacity when in the expanded position of at least 3000 litres, at least 4000 litres, at least 5000 litres, or at least 6000 litres. Alternatively, the flexible container may have a capacity when in the expanded position of less than 2000 litres, for example about 500 litres, about 1000 litres, or about 1500 litres.

The depth of the flexible container when in the collapsed position may be chosen as required, for example based on the anticipated available clearance during transport between the bottom of the support and an adjacent structure, such as the trailer of a truck or the deck of a ship on which the liquid containment assembly is transported to the wind turbine installation site.

In some examples, the flexible container has a depth of less than about 50 centimetres when in the collapsed position, preferably less than about 40 centimetres, more preferably less than about 30 centimetres, and most preferably less than about 20 centimetres.

By collapsing to such a small depth, the liquid containment assembly can be more easily accommodated during transport of wind turbine equipment.

The support is arranged to support wind turbine equipment. That is, one or more items of wind turbine equipment. In some examples, the wind turbine equipment includes a liquid-cooled electrical transformer unit. Alternatively, or in addition, the wind turbine equipment may be a gearbox.

According to a second aspect of the present invention, there is provided a flexible container for a liquid containment assembly according to any of the embodiments described above, the flexible container comprising a flexible bag and a rigid frame from which the flexible bag is suspended.

According to a third aspect of the invention, there is provided a wind turbine comprising a liquid containment assembly according to any of the embodiments described above.

In some examples, the liquid containment assembly is arranged within a power module in the wind turbine tower, typically referred to as a power conversion module or a power control module.

The power conversion module may further comprise power handling equipment arranged on the support of the liquid containment assembly. For example, the power conversion module may further comprise an electrical transformer unit arranged on the support of the liquid containment assembly As used herein, the term "power conversion module" refers to a pre-assembled module having one or more platforms on which power handling equipment is pre-assembled prior to assembling the module into a wind turbine tower. The use of such a module may reduce the risk of damage to the power handling equipment during installation and reduces the time required to assemble the wind turbine.

In some examples, the power handling equipment includes a liquid-cooled electrical transformer unit.

In other examples, the liquid containment assembly is arranged within the nacelle of the wind turbine. In such examples, the liquid containment assembly is preferably connected to a load-bearing member of the nacelle.

According to a fourth aspect of the present invention, there is provided a method of installing a power conversion module in a wind turbine comprising the steps of: providing a power conversion module comprising a liquid containment assembly as described above; holding the flexible container of the liquid containment assembly in a collapsed or partially collapsed position; transporting the power conversion module to an installation site; positioning the power conversion module in the wind turbine; and moving the flexible container to its expanded position.

The flexible container may be releasably held in its collapsed position by one or more retaining means provided on the liquid containment assembly Alternatively, the flexible container may be held in its collapsed position simply by compressing the flexible container between the underside of the support and an object adjacent to the support during transportation, for example between the underside of the support and the trailer of a truck or the deck of a ship on which the power conversion module is transported.

The step of moving the flexible container to its expanded position may be carried out at any suitable time. For example, it may be carried out prior to, during, or after installation of the power conversion module. It may be carried out prior to or during use of the wind turbine. The flexible container may be manually moved to its expanded position, or automatically moved, for example under the action of its own weight or the weight of liquid contained in the container.

Features described in relation to one or more aspects may equally be applied to other aspects of the invention. In particular, features described in relation to the liquid containment assembly of the first aspect may be equally applied to the flexible container of the second aspect, or to the wind turbine of the third aspect and vice versa, and features described in relation to the liquid containment assembly of the first aspect, to the flexible container of the second aspect, or to the wind turbine of the third aspect may equally apply to the method of installing of the fourth aspect.

BRIEF DESCRIPTION OF THE DRAWINGS

The invention will now be further described by way of example only and with reference to the accompanying figures in which.

DETAILED DESCRIPTION

Figure 1:
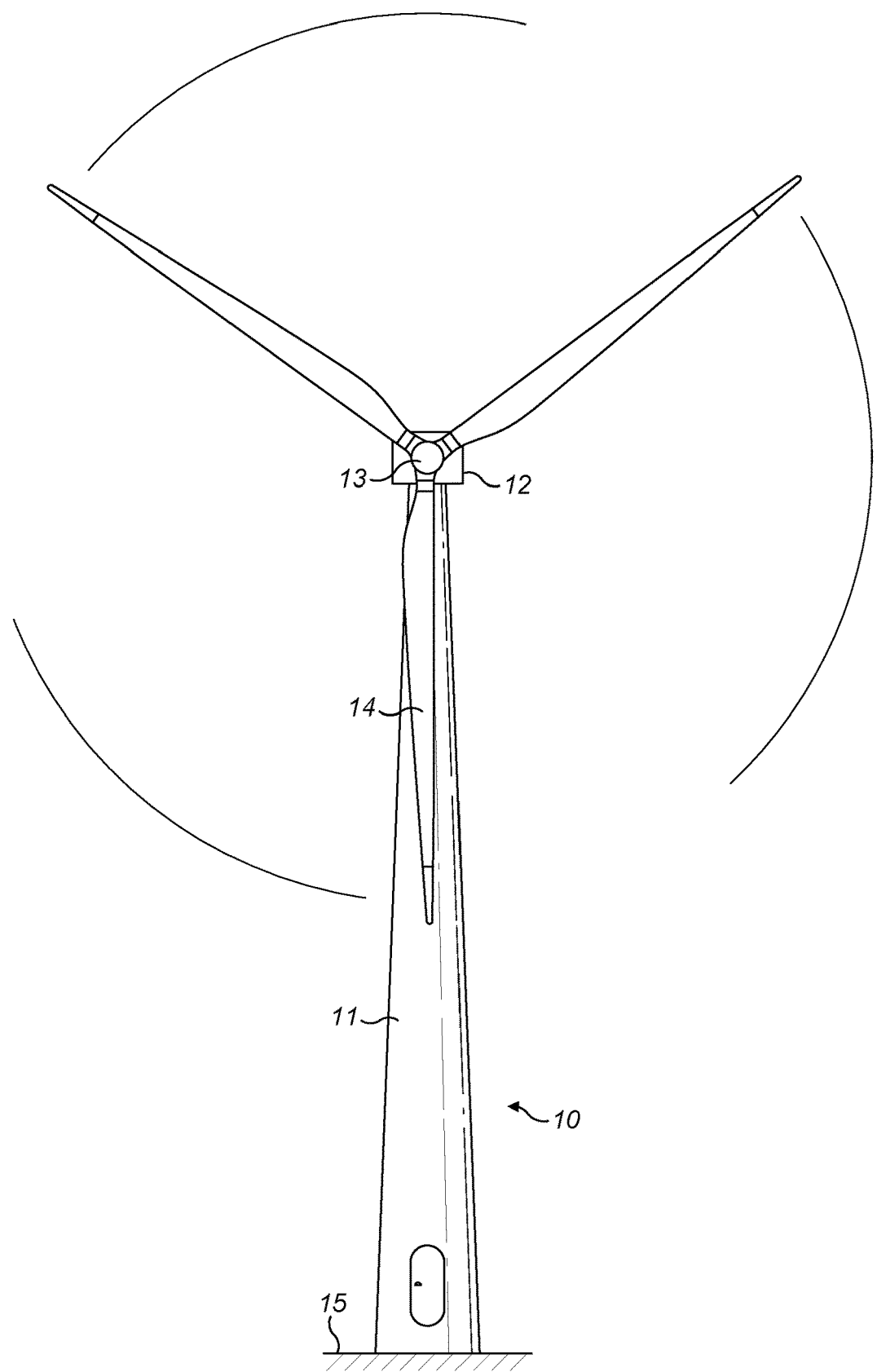
FIG. 1 is a front view of a wind turbine.

FIG. 1 illustrates a modern wind turbine 10 comprising a tower 11 and a wind turbine nacelle 12 positioned on top of the tower 11. The wind turbine rotor 13, comprising three wind turbine blades 14, is connected to the nacelle 12 through a low speed shaft (not shown) which extends out of the front of the nacelle 12. The tower 11 is supported on and secured to the wind turbine foundation 15. The nacelle 12 includes a gear, a breaking system and a generator for converting the rotation of the rotor 13 into electrical current. The wind turbine typically includes other equipment, such other items of power handling equipment, some of which may contain liquid. Where the wind turbine includes other items of power handling equipment, these may be placed on platforms inside the wind turbine tower 11, as described below in relation to FIGS. 4A and 4B, or in the nacelle 12, as described in relation to FIG. 5 below. In large wind turbines, particularly offshore wind turbines, the power handling equipment is typically placed on platforms towards the bottom of the tower 11 in a power conversion module.

Figure 2A:
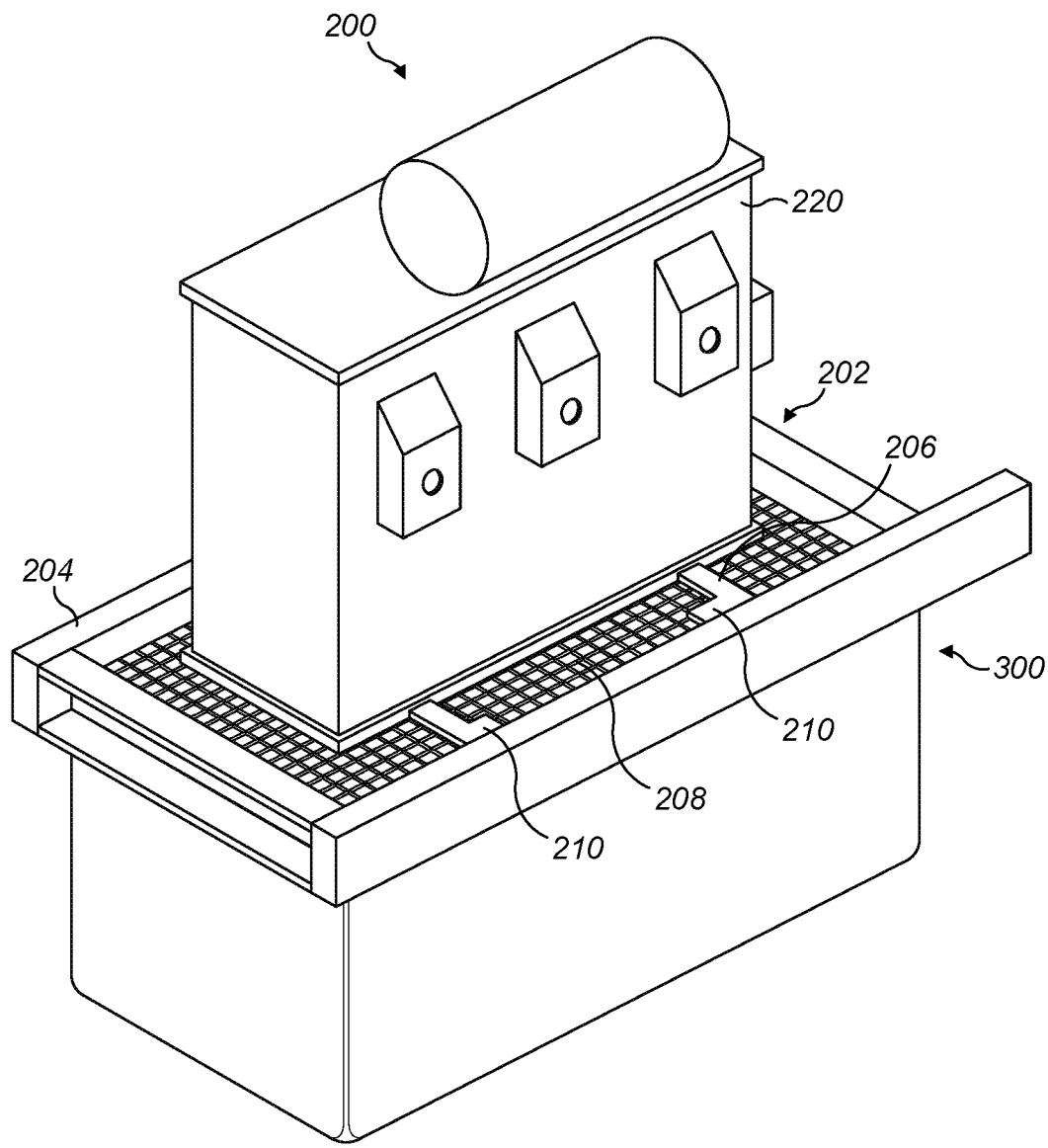
FIG. 2A is a perspective top view of a liquid containment assembly according to the present invention, showing the flexible container in an expanded position and the support supporting an electrical transformer unit.
Figure 2B:
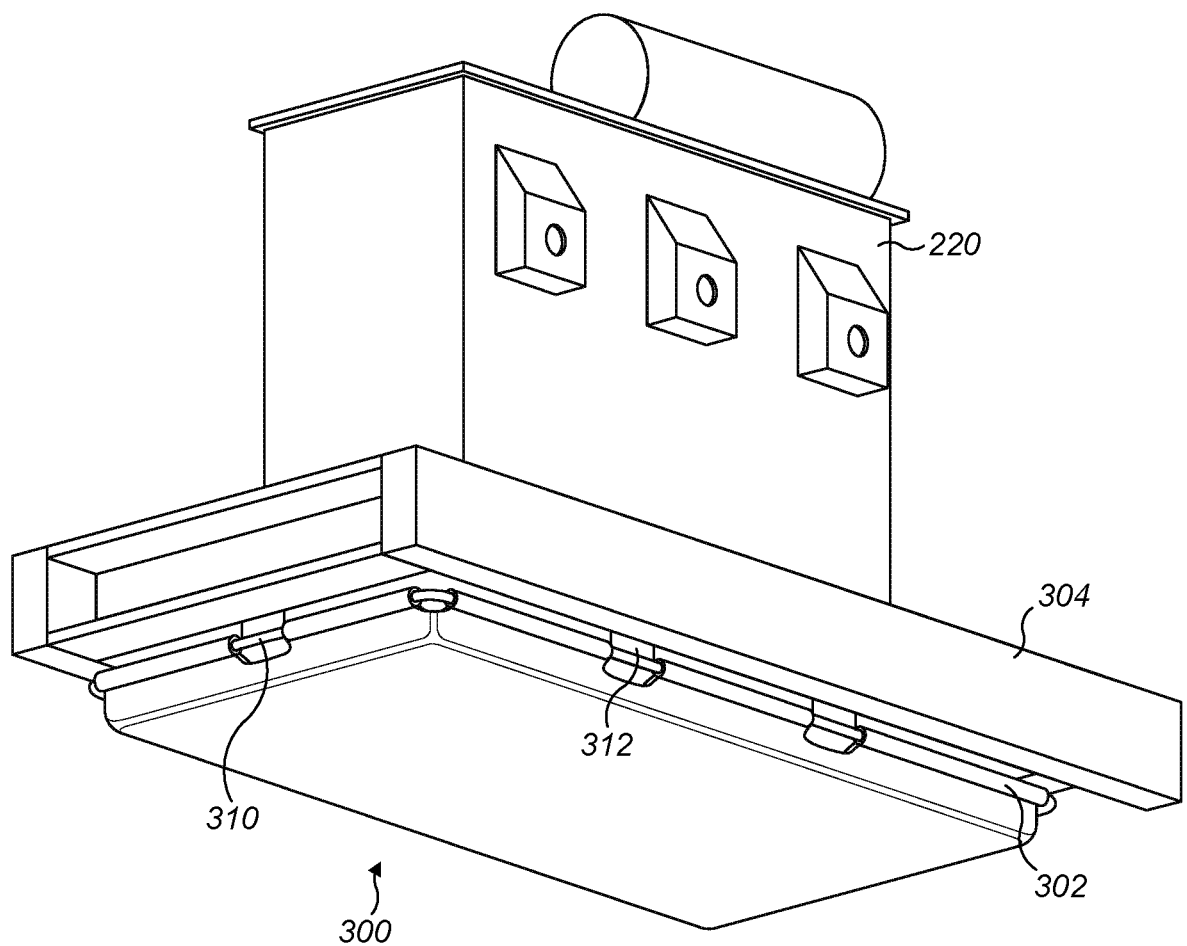
FIG. 2B is a perspective bottom view of the liquid containment assembly of FIG. 2A, showing the flexible container in the collapsed position.

There is a general requirement for any spillage or leakage of liquid contained in the wind turbine equipment to be contained. FIGS. 2A and 2B illustrate a liquid containment assembly 200 according to a first example. The liquid containment assembly 200 includes a support 202 and a flexible container assembly 300 attached to and suspended beneath the support 202. The support 202 is attached to a load-bearing structure 204 of the wind turbine and includes brace members 206 and a floor 208. The load-bearing structure 204 may be a primary load-bearing structure of the wind turbine, or may be beams connected to a primary load-bearing structure of the wind turbine. The brace members 206 are connected to the load-bearing structure 204. The floor 208 is supported by the brace members 206 of the support 202. The brace members 206 also form a platform for supporting wind turbine equipment. In this example, the wind turbine equipment is an electrical transformer unit 220 arranged on the support 202. For offshore wind turbines, such transformer units may contain in excess of 6000 litres of oil and weigh in excess of 10 tonnes. Consequently, the support 202 must have sufficient strength and rigidity to support high levels of vertical loading. The floor 208 has an open mesh and is formed from one or more grating panels, such as grating panels made from stainless steel or aluminium. This also allows fast drainage of liquid through the floor 208. The floor 208 also includes access panels 210 which may be removed to allow access to the flexible container assembly 300 from above the support 208.

The flexible container assembly 300 includes a flexible container 302 mounted on a rigid frame 310 bolted to the underside of the support 202 using connector plates 312. The support 202 may be connected to one or more load-bearing structures of the wind turbine by hinges to allow the liquid containment assembly 200 to be rotated out of the way to form an opening for allowing operator access. This should only be carried out once the transformer unit 220, or other equipment arranged on the support has been safely removed.

FIGS. 3A to 3G illustrate the flexible container assembly 300 in more detail. The flexible container 302 is a flexible bag formed from opposed pairs of vertically extending side walls 304 joined to a horizontal bottom wall 306 along their lower edges. The top of the bag 302 defines an opening 308 through which liquid can be collected in the container assembly 300. In this example, the side and bottom walls 304 and 306 are rectangular and, consequently, the flexible bag has a rectangular parallelepiped shape with an open top. It will be understood that any number or arrangement of walls may be used such that the arrangement shown in FIGS. 3A to 3G is by way of example only. Along the top edges of the side walls 304 are a series of fixing loops 305 through which the rigid frame 310 extends. The flexible bag 302 hangs from the rigid frame 310 under its own weight via the loops 305. With this arrangement, when the rigid frame 310 is attached to the support, the flexible bag 302 is suspended beneath the floor of the support with its opening facing upwards towards the floor. The flexible bag may be formed from any suitable material. For example, the flexible bag may be made from a tarpaulin material. That is, from a strong flexible water-resistant or waterproof material such as canvas or polyester coated in urethane, or a plastic such as polyethylene or PVC. The flexible bag may be made from a single sheet of material or from a number of sheets of material joined or sealed together along their edges.

In this example, the rigid frame 310 is formed from two pairs of tubular elements 314, 316 joined at right angles to define the shape of the container assembly 300. Connector plates 312 are bolted to the tubular elements 314, 316 at intervals around the rigid frame 310. These connector plates 312 extend upwardly from the rigid frame 310 and are used to attach the rigid frame 310 to the support of the liquid containment assembly 200.

Figure 3A:
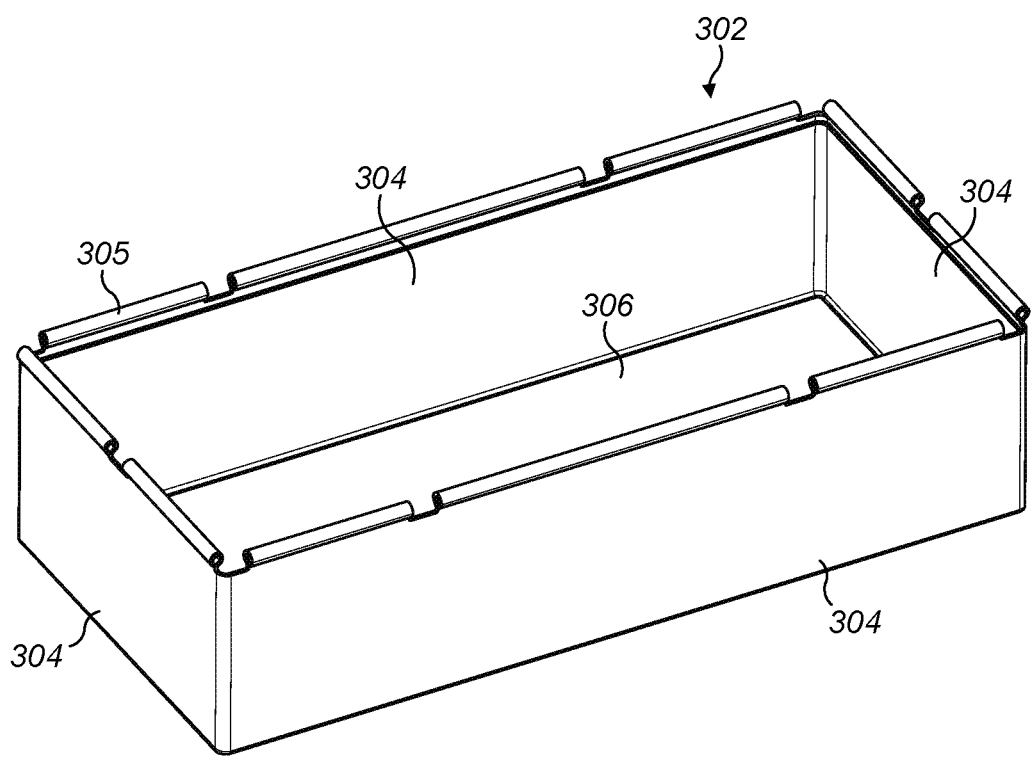
FIG. 3A is a perspective top view of a flexible container for a liquid containment assembly according to the present invention, the flexible container being shown in an expanded position.
Figure 3B:
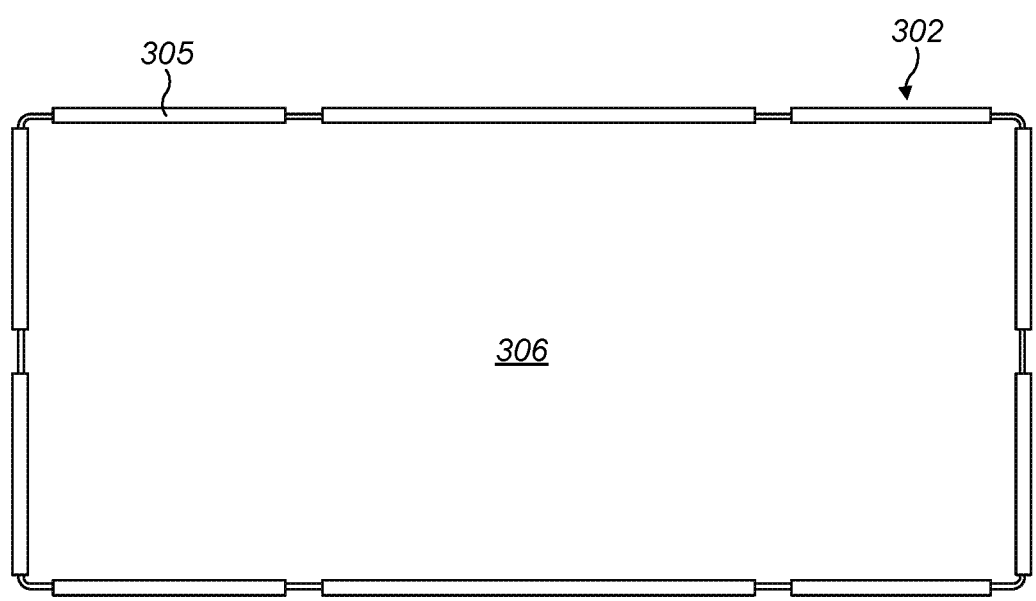
FIG. 3B is a top view of the flexible container of FIG. 3A.
Figure 3C:
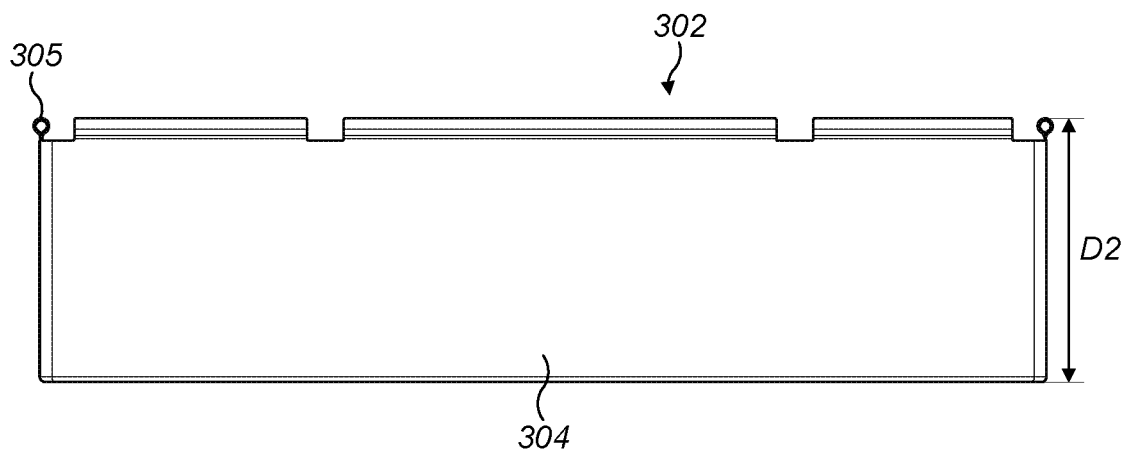
FIG. 3C is a side view of the flexible container of FIG. 3A in the expanded position.
Figure 3D:
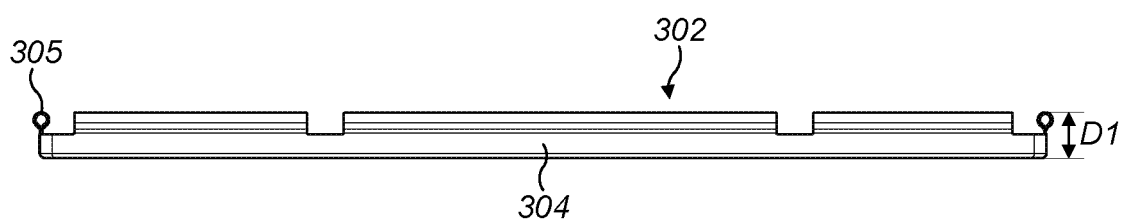
FIG. 3D is a side view of the flexible container of FIG. 3A in the collapsed position.
Figure 3E:
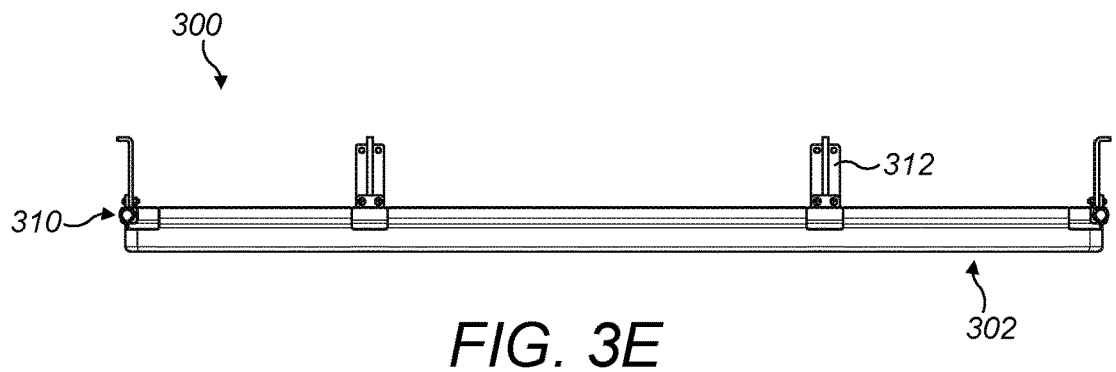
FIG. 3E is a side view of a flexible container assembly showing the flexible container in the collapsed position.
Figure 3F:
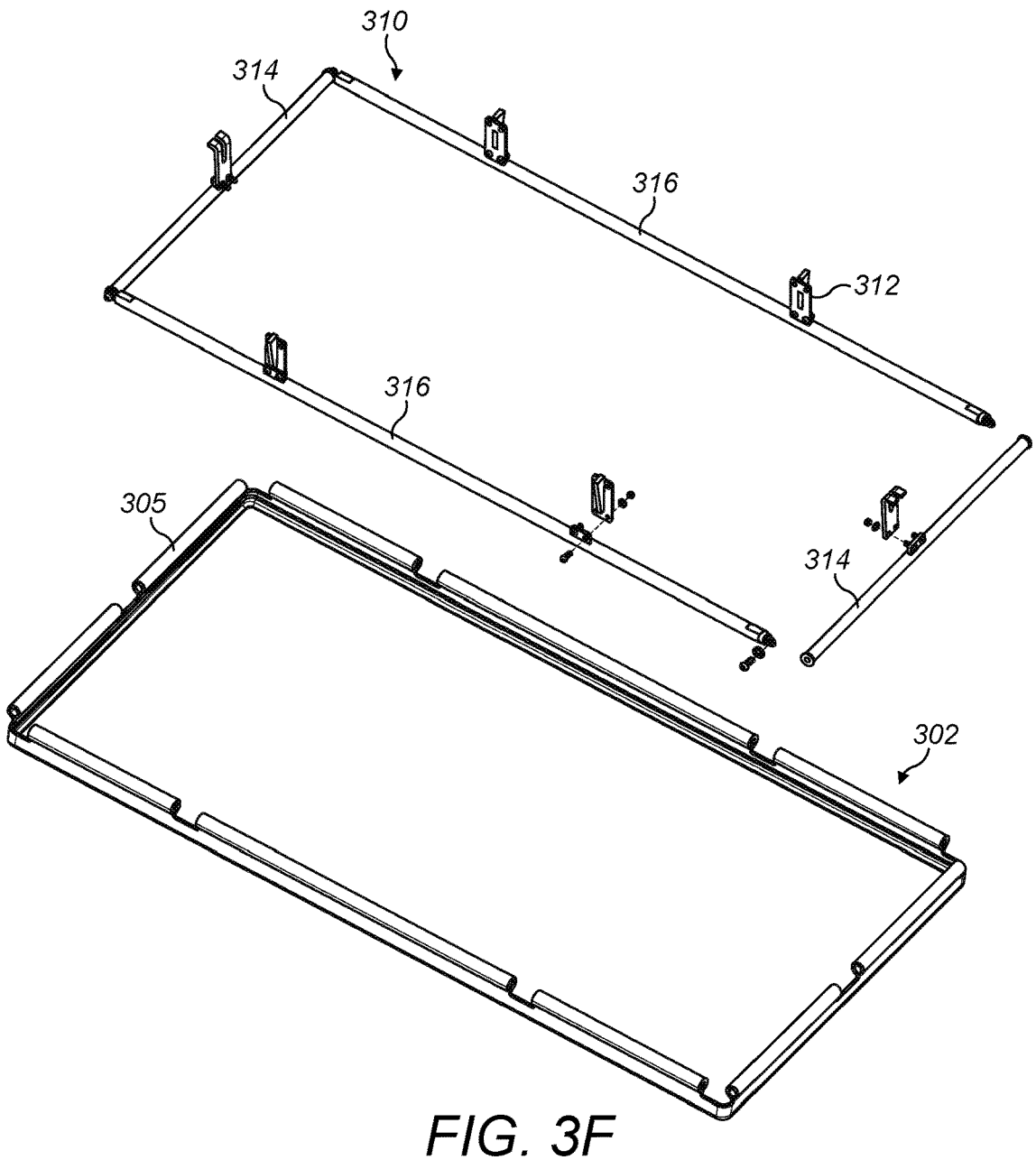
FIG. 3F is an exploded top perspective view of the flexible container assembly of FIG. 3E.
Figure 3G:
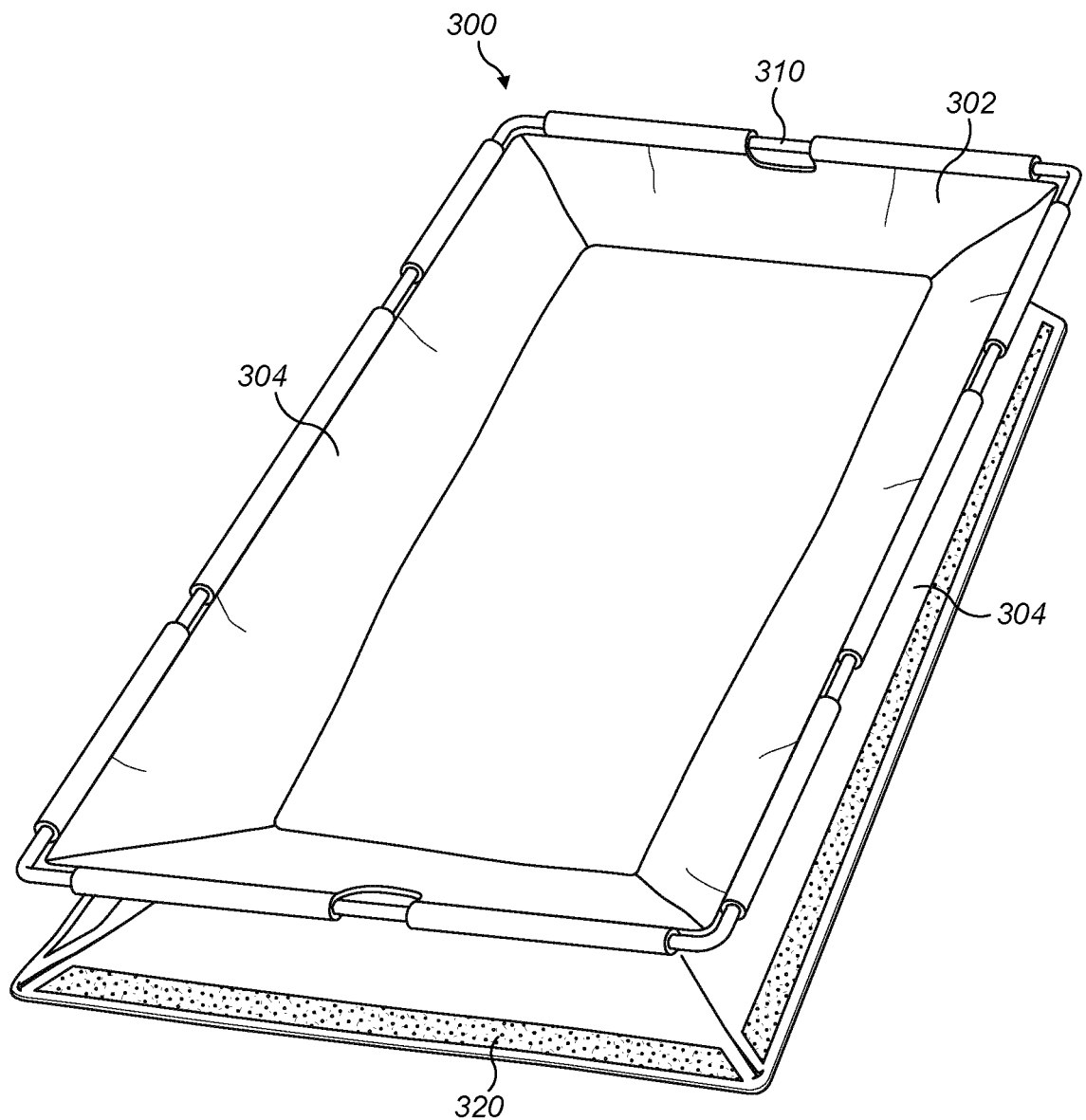
FIG. 3G is a top perspective view of the flexible container assembly of FIG. 3E showing the flexible container in a partially expanded position.

As can be seen in FIGS. 3C and 3D, the flexible container 302 is movable between a collapsed position, in which the side walls 304 are deformed to bring the bottom wall 306 close to the rigid frame 310 (as shown in FIG. 3D), and an expanded position, in which the side walls 304 are fully extended and the bottom wall 306 is at its furthest extent from the rigid frame 310 (as shown in FIG. 3C). In this manner, the depth and the capacity of the flexible container can be minimised by holding the bag in a normally compact condition and can be increased to contain a liquid leak if required by expanding the flexible bag 302. As shown, the liquid containment assembly 200 has a first depth D1 when in the collapsed position and a second depth D2 when in the expanded position. The flexible container assembly 300 may have any suitable shape or dimensions. In one example, the flexible container assembly has a length of about 3700 millimetres, a width of about 1750 millimetres, a depth in the expanded position of about 950 millimetres and a depth in the collapsed position of about 150 millimetres. Taking into account the dimensions of the rigid frame 310 and the fixing loops 305, this equates to a capacity in the expanded position of about 6000 litres and a capacity in the collapsed position of about 900 litres.

In some examples, the liquid containment assembly 200 further comprises retaining means 320 for holding the flexible bag 302 in the collapsed position. For example, the retaining means may comprise one or more strops, cables, ropes, hook and loop fasteners, temporary welds, snap fasteners, or any combination thereof, which can be manually released to allow the flexible container to expand. In the example shown in FIG. 3G, the flexible bag 302 is collapsed by folding the side walls 304 and the retaining means is in the form of a series of hook and loop fastener strips 320, such as strips of Velcro®, extending along a bottom edge of the side walls 304 and along a corresponding edge at the top of the side walls 304 or on the underside of the fixing loops 305 to hold the side walls 304 in a folded condition. When in the collapsed position, the hook and loop fastener strips 320 hold the bag 302 in place until the weight of liquid collected in the bag 320 exceeds a threshold amount which is equivalent to the fastening strength of the fastener strips 320. At that point, the two parts of the hook and loop fastener 320 separate and the bag 320 extends to the expanded position under its own weight and that of the liquid collected therein. In alternative examples, the side walls 304 may be pleated to allow the bag 302 to be collapsed. Although not shown in FIG. 3G, the retaining means may further comprise a second set of hook and loop fasteners for holding the flexible bag in a partially expanded position once the holding force of the first set of hook and loop fasteners 320 has been exceeded, the second set of hook and loop fasteners having a greater fastening strength than the first set of hook and loop fasteners.

In use, the flexible container assembly 300 is suspended beneath the support 202 with the opening 308 of the flexible bag 302 facing upwards towards the support 202. Initially, the flexible bag 302 is held in the collapsed position by the hook and loop fasteners 320. Liquid leaking from wind turbine equipment arranged on the support 202, such as transformer unit 220, drains through the open mesh in the floor 208 of the support 202 and into the bag 302. As the weight of the liquid increases, so too does the force applied to the hook and loop fasteners 320. Once this force exceeds the fastening strength of the fasteners 320, in other words the force that can be withstood by the fasteners 320 before separation occurs, the fasteners 320 separate and the flexible bag 320 moves from the collapsed position to the expanded position under the weight of the liquid contained in the bag 302 and the weight of the bag itself. To remove liquid from the flexible container assembly 300, the access panels 210 in the floor 208 are removed or hinged open to reveal access ports through which a hose can be inserted into the flexible container assembly 300. The hose is then connected to a source of vacuum, such as a liquid removal pump, to draw the liquid from the bag 302. Once the liquid has been removed from the container 302, the hose is withdrawn from the access ports and the access panels returned to their initial position. In this manner, the liquid is prevented from leaking into lower parts of the wind turbine nacelle or tower.

Figure 4A:
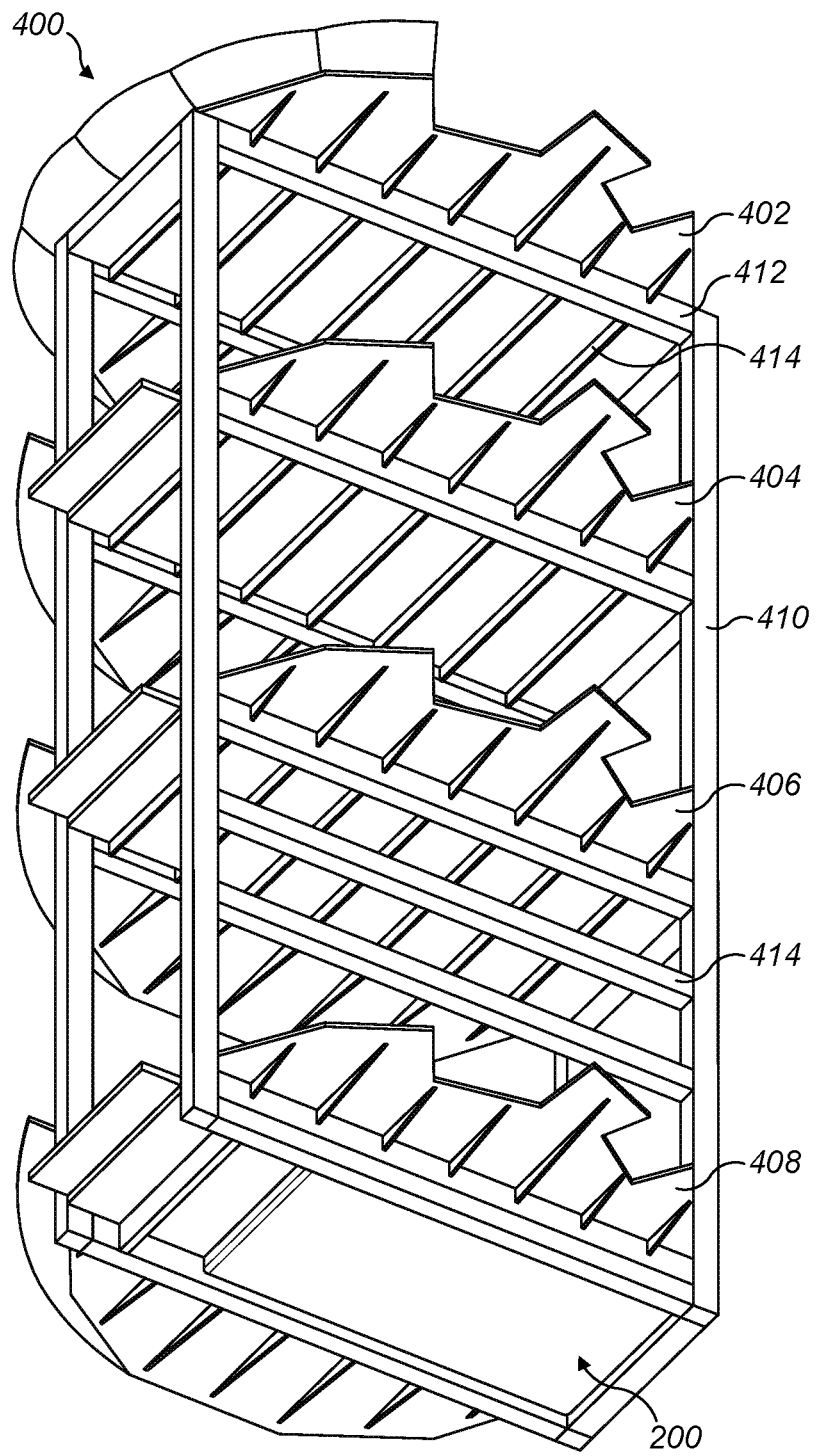
FIG. 4A is a perspective bottom view of a power conversion module including a liquid containment assembly according to the present invention.
Figure 4B:
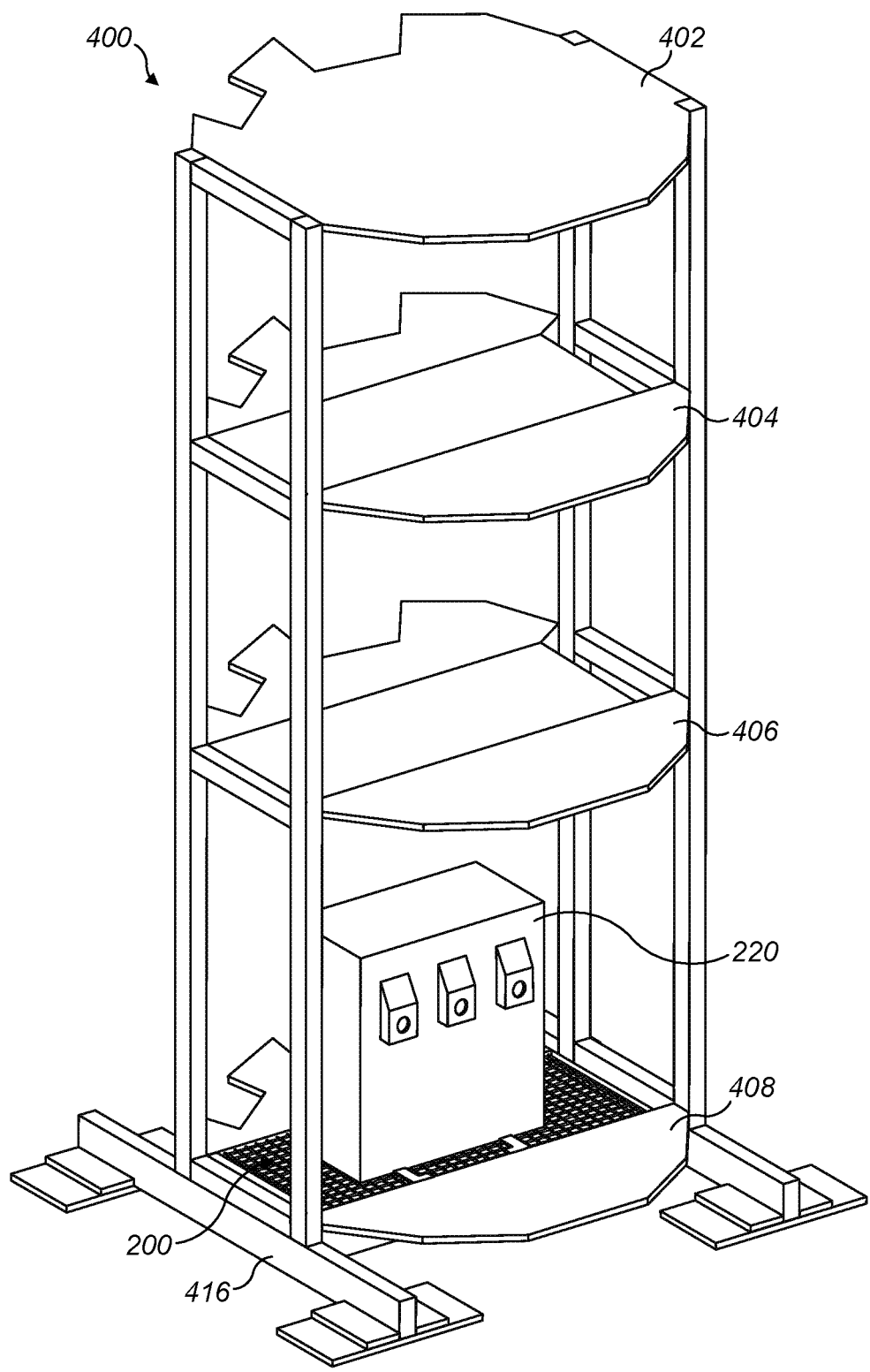
FIG. 4B is a perspective top view of the power conversion module of FIG. 4A, showing the power conversion module on transport beams for transportation.

FIGS. 4A and 4B illustrate a power conversion module 400 for a wind turbine, such as that shown in FIG. 1. The power conversion module 400 is pre-assembled and forms an inner portion of the wind turbine tower, typically towards or at the base of the tower. In this example, the module 400 includes four levels 402, 404, 406 and 408 vertically spaced apart along upwardly extending support elements 410. It will be understood that any number of levels may be included and that the four levels shown in FIGS. 4A and 4B are by way of example only. Each level 402, 404, 406 and 408 includes one or more floor panels 412 positioned on horizontal support elements 414. The horizontal support elements are fixed to the upwardly extending support elements 410 in a conventional manner, for example using bolts or welds. Levels 402, 404, 406 and 408 may each support electrical components or other components of the wind turbine, although for clarity, the components on the top level 402 and middle levels 404 and 406 are not shown in FIGS. 4A and 4B. The base level 408 is a transformer level and includes an electrical transformer unit 220 arranged on a liquid containment assembly 200, as discussed above in relation to FIGS. 2 and 3.

As shown in FIG. 4B, the module 400 can be secured to or rested on transport beams 416 during transport. Since the flexible container assembly is collapsible, it can be suspended from the underside of the support even though clearance beneath the support is limited.

Figure 5:
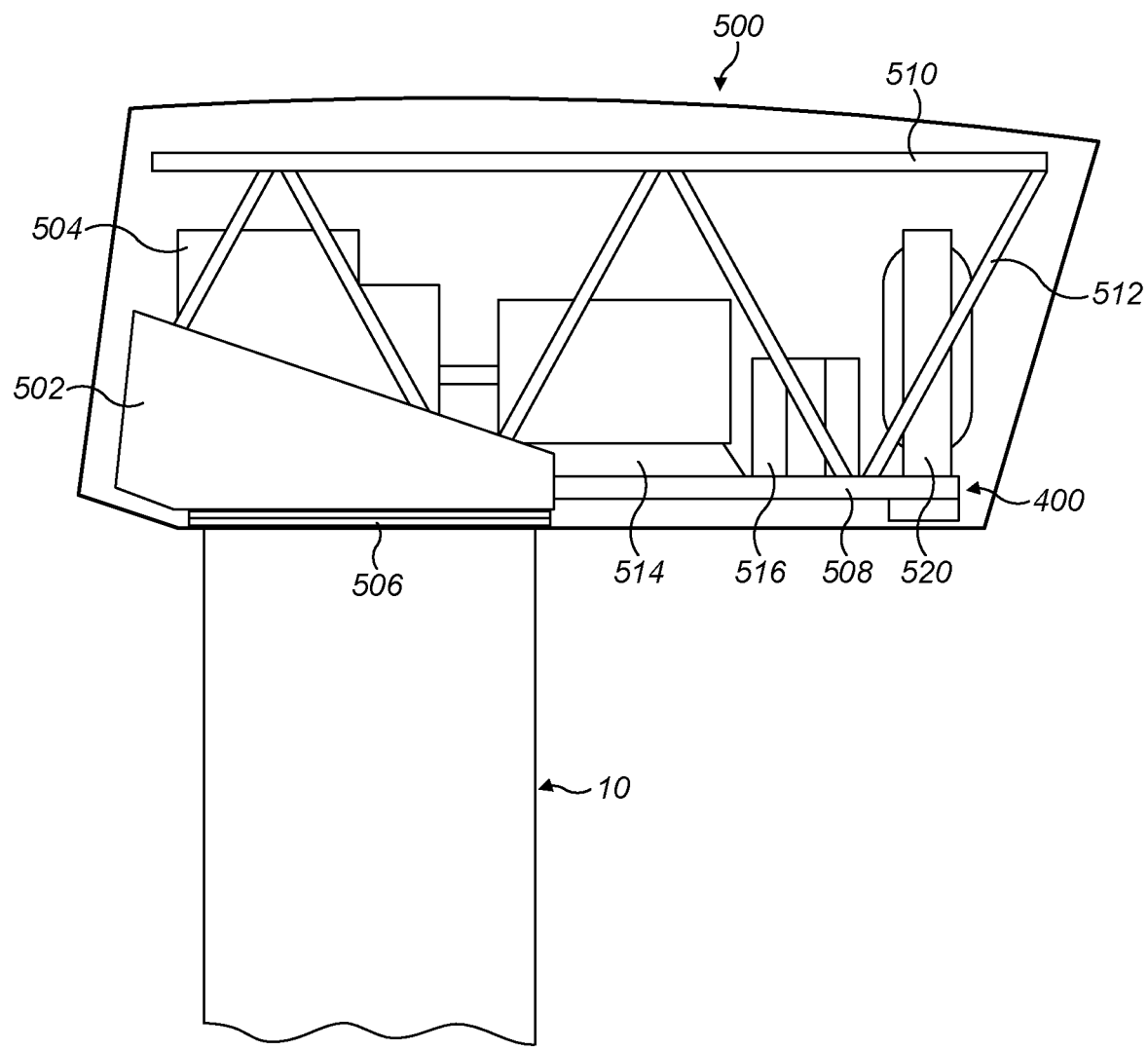
FIG. 5 is a schematic cross-sectional side view of a wind turbine nacelle including a liquid containment assembly according to the present invention.

FIG. 5 illustrates a schematic cross-sectional side view of a wind turbine nacelle including a liquid containment assembly according to the invention. The nacelle 500 includes a bedframe as a bell-shaped member 502 carrying a gearbox 504 and a yaw mechanism 506 allowing a rotational connection to the tower 11. The illustrated nacelle 500 also includes two sets of horizontally orientated lower and upper side beams 508, 510. The lower side beams 508 are attached to the bell-shaped member 502. The lower and upper beams 508, 510 are directly or indirectly connected by a number of further beams 512 in order to establish a nacelle structure. A floor level support structure is established between the two lower side beams 508 in order to carry wind turbine equipment such as an electric generator 514, a power converter 516 (illustrated in FIG. 5 as a number of converter units), and a transformer 520. As with the transformer 220 discussed above, the transformer 520 transforms the electric power generated by the generator 514 and converted by the power converter 516 to a different high voltage level for feeding the power to the utility grid. Between the two lower side beams 508 is a liquid containment assembly 200 as described above in relation to FIGS. 2A and 2B. The platform of the liquid containment assembly 300 may comprise the floor level support structure between the lower side beams 508, or it may be a separate structure connected to a load-bearing structure of the nacelle 500, such as the floor level support structure or the side beams 508.

In the above embodiments, by including a liquid containment assembly with a flexible container which is moveable between collapsed and expanded positions, the spaced occupied by the liquid containment assembly can be minimised when its full capacity is not required. This allows the flexible container to be collapsed or partially collapsed during transport, installation or use, in particular where the clearance beneath the support is limited, and subsequently expanded to increase its capacity once required. This allows the liquid containment assembly to be provided with a much larger capacity than might otherwise be possible with a rigid container. It also means that the liquid containment assembly can be installed under the wind turbine equipment prior to transport. This reduces the installation steps required at the wind turbine site. It also allows the liquid containment to be used to intercept and collect liquid that may be leaked from the wind turbine equipment during transport or installation.

It will be appreciated that various modifications to the embodiments described above are possible and will occur to those skilled in the art without departing from the scope of the invention which is defined by the following claims.

The invention claimed is:

1. A liquid containment assembly for a wind turbine, comprising:
   a support for supporting wind turbine equipment; and
   a flexible container suspended beneath the support for collecting liquid leaked from the wind turbine equipment, wherein when the flexible container is in a liquid collection capacity during use, the flexible container is moveable between a collapsed position, in which the liquid containment assembly has a first depth, and an expanded position, in which the liquid containment assembly has a second depth, the second depth being greater than the first depth.

2. The liquid containment assembly according to claim 1, wherein the flexible container has a first capacity when in the collapsed position and a second capacity when in the expanded position, the second capacity being at least twice the first capacity.

3. The liquid containment assembly according to claim 1, wherein the flexible container comprises a flexible bag.

4. The liquid containment assembly according to claim 3, wherein the flexible container further comprises a rigid frame from which the flexible bag is suspended.

5. The liquid containment assembly according to claim 1, wherein the liquid containment assembly further comprises a retaining means for releasably holding the flexible container in the collapsed position.

6. The liquid containment assembly according to claim 5, wherein the retaining means is selected from the group consisting of: strops; cables; ropes; hook and loop fasteners; temporary welds; snap fasteners; or any combination thereof.

7. The liquid containment assembly according to claim 5, wherein the retaining means is adapted to release the flexible container from the collapsed position when a weight of liquid in the flexible container exceeds a threshold value.

8. The liquid containment assembly according to claim 1, wherein the support comprises an access hole for providing access to the flexible container from above the support.

9. The liquid containment assembly according to claim 1, wherein the flexible container has a capacity of at least 2000 litres when in the expanded position.

10. The liquid containment assembly according to claim 1, wherein the first depth is less than a 20 cm when in the collapsed position.

11. The liquid containment assembly according to claim 1, wherein the wind turbine equipment is a liquid-cooled wind turbine transformer.

12. The flexible container for a liquid containment assembly according to claim 1, the flexible container comprising a flexible bag and a rigid frame from which the flexible bag is suspended.

13. A wind turbine comprising a liquid containment assembly according to claim 1.

14. The wind turbine according to claim 13, wherein the wind turbine includes a tower and the liquid containment assembly is arranged within a power conversion module in the tower.

15. The wind turbine according to claim 13, wherein the wind turbine includes a nacelle and the liquid containment assembly is arranged within the nacelle.

16. The wind turbine according to claim 15, wherein the liquid containment assembly is connected to a load bearing member of the nacelle.

17. A method of installing a power conversion module in a wind turbine comprising:
   providing a power conversion module comprising a liquid containment assembly according to claim 1;
   holding the flexible container of the liquid containment assembly in the collapsed position or a partially collapsed position;
   transporting the power conversion module to an installation site;
   positioning the power conversion module in the wind turbine; and
   moving the flexible container to its expanded position.

18. An assembly for a wind turbine, comprising:
   a support;
   wind turbine equipment positioned on the support; and
   a flexible container suspended beneath the support for collecting liquid leaked from the wind turbine equipment, wherein when the flexible container is in a liquid collection capacity during use, the flexible container is moveable between a collapsed position, in which the flexible container has a first depth, and an expanded position, in which the flexible container has a second depth, the second depth being greater than the first depth.

* * * * *